Oct. 28, 1930. A. K. SMITH ET AL 1,780,098
METHOD OF SEPARATING CALCIUM AND MAGNESIUM CHLORIDES
Filed June 16, 1925
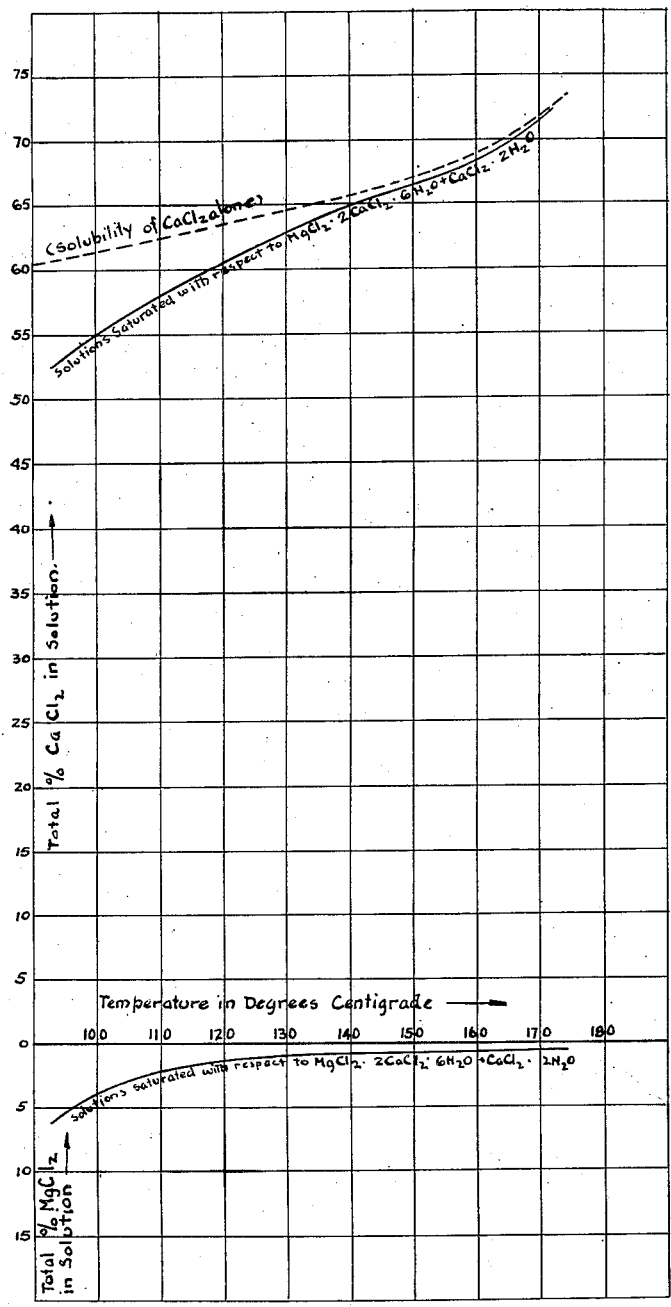
INVENTORS
Albert Kelvin Smith and
Carl F. Prutton
BY
Fay. Oberlin & Fay
ATTORNEYS.

UNITED STATES PATENT OFFICE

ALBERT KELVIN SMITH, OF MIDLAND, MICHIGAN, AND CARL F. PRUTTON, OF EAST CLEVELAND, OHIO, ASSIGNORS TO THE DOW CHEMICAL COMPANY, OF MIDLAND, MICHIGAN, A CORPORATION OF MICHIGAN

METHOD OF SEPARATNG CALCIUM AND MAGNESIUM CHLORIDES

Original application filed September 29, 1923, Serial No. 665,737. Divided and this application filed June 16, 1925. Serial No. 37,465.

In our co-pending application, filed September 29, 1923, Serial No. 665,737, there is disclosed an improved method or process for treating brines which contain calcium and magnesium chlorides, with the object of separating the chlorides from each other. Incidentally to such process, the calcium and magnesium chlorides, at least in part, are crystallized out of the solution in the form of a double salt known as tachydrite $$(CaCl_2.2MgCl_2.12H_2O),$$

which with adherent mother liquor would contain approximately 25 per cent calcium chloride and 32 per cent magnesium chloride. These crystals are then separated from the mother liquor and, by appropriate treatment, the calcium chloride content may be separated from the magnesium chloride and the latter purified as set forth in the above application and in another co-pending application filed by us under date of October 13, 1923, Serial No. 668,356, Patent No. 1,768,797.

The mother liquor remaining after separating out such crystals is also treated to separate the magnesium chloride from the relatively larger amount of calcium chloride remaining therein, and the present application which has been required to be divided out of our aforesaid application, Serial No. 665,737, Patent No. 1,627,068, relates more particularly to this phase of the general process.

It will be understood of course that the method of separation involved is not limited in its utilization to a mother liquor derived in the specific manner just set forth but that such treatment may be employed for the separation of magnesium and calcium chlorides occurring in any similar solution, or mixture, however derived.

To the accomplishment of the foregoing and related ends, the invention then consists of the steps fully described and particularly pointed out in the claims, the annexed drawing and the following description setting forth in detail one improved method of carrying out the invention; such disclosed mode, however, illustrates merely the various ways in which the principle of the invention may be used.

In said annexed drawing:—

The single figure is a diagram wherein the saturation points of certain compounds involved in the process are shown by appropriate curves.

When an aqueous solution of calcium chloride and magnesium chloride, in which the molecular proportion of calcium chloride to magnesium chloride is greater than two to one, is sufficiently concentrated by evaporation at temperatures between 90° C. and 175° C. (the lower limit depending upon the proportion) a hydrated double chloride having the composition $$MgCl_2.2CaCl_2.6H_2O$$

is precipitated. As the evaporation is continued, (the temperature being held constant) and more of the double chloride is formed, the molecular proportion of calcium chloride to magnesium chloride in the remaining solution continually increases until calcium chloride dihydrate, $CaCl_2.2H_2O$, begins to precipitate along with the double chloride. From this point on, further evaporation does not change the composition of the remaining solution; and for a given temperature the solution thus obtained (i. e. the mother liquor) contains the minimum amount of magnesium chloride. The relation between the composition of the final solution and the temperature is shown by the attached diagram. It will be seen that, as the temperature is increased, the magnesium chloride content decreases, approaching one-half of one per cent at 175° C.; on the other hand, the calcium chloride content increases, approaching that of a saturated solution of calcium chloride alone (i. e. of calcium chloride containing no magnesium chloride).

To purify calcium chloride containing magnesium chloride in an amount less than is equivalent to a molecular proportion of two to one, it is therefore necessary only to concentrate a solution of the impure material and remove the crystals formed at a temperature between 90° and 175° C. A product containing the minimum amount of magnesium chloride is obtained by carrying out the separation of crystals from solution at the maximum temperature, the water content of the mixture having been reduced until the crystals consist of the hydrated double chloride, $$MgCl_2.2CaCl_2.6H_2O,$$

and a smaller amount of calcium chloride dihydrate, $CaCl_2.2H_2O$.

The presence of calcium chloride dihydrate in the crystals, however, is a disadvantage during separation for two reasons: the difficulty of separation is increased, and the efficiency of the process is reduced because of the increased calcium chloride content of the crystals. It is, therefore, usually preferable to remove slightly less water than will cause the precipitation of calcium chloride dihydrate at the temperature at which the removal of crystals is to take place.

Actual operation of the process may be varied in many respects. For example, the evaporation may take place at atmospheric pressure and the mixture subsequently be cooled to the temperature desired for removing the crystals, or the evaporation may be carried out under sufficient vacuum to reduce the boiling point of the final solution to the proper temperature for filtration. In either case, the crystals may be removed as soon as formed, or left in until the precipitation is complete before separating from the mother liquor.

A still different procedure may be adopted to insure a minimum amount of magnesium chloride left in solution, together with a minimum amount of calcium chloride in the crystals, as follows:

The boiling point during evaporation is reduced by vacuum to a temperature (e. g. 120° C.) below that at which the separation of crystals is to be made. Evaporation is continued until $CaCl_2.2H_2O$ begins to precipitate with the crystals. The mixture is then heated, during agitation, until the $CaCl_2.2H_2O$ is just dissolved (say 140° C.) and the remaining crystals (consisting of $MgCl_2.2CaCl_2.6H_2O$ alone) separated from the mother liquor at that temperature.

The principle involved in the process is simply the control of the total amount of water (as $H_2O$) in the mixture of crystals and mother liquor before removal of the crystals. This percentage of total water in the mixture depends upon the proportion of calcium chloride to magnesium chloride (conveniently expressed as per cent $MgCl_2$ in the total anhydrous chlorides) and upon the temperature of removal of crystals; while the composition of the mother liquor depends only upon the temperature, as hereinbefore explained.

It is apparent that if the raw material already contains less than the required amount of water, instead of evaporating, it will be necessary only to add water and heat as required, agitate until crystals and solution are in equilibrium, and then remove the crystals.

The apparatus employed may consist of the usual vacuum evaporator (or open pan in the case of evaporation at atmospheric pressure), a tank equipped with agitator and coils for heating or cooling, and a filtering device, e. g., box filter, false-bottomed tank, filter press, or centrifuge.

The crystals of hydrated magnesium calcium chloride, $$MgCl_2.2CaCl_2.6H_2O,$$

are obtained as a by-product. These are contaminated with more or less mother liquor, and perhaps also with calcium chloride dihydrate ($CaCl_2.2H_2O$). However, the molecular ratio of calcium chloride to magnesium chloride should be only slightly more than two to one. Since this by-product is extremely hygroscopic, it may be put on the market directly as a dust-preventive. It is probably more advantageously disposed of by treating according to the method of our co-pending application, Serial No. 665,737. If used in this way, it should be admitted to that process with the brine which has been freed of sodium chloride by previous evaporation and filtration, i. e., at the point where tachydrite is to be precipitated by evaporation.

This process is, in fact, very conveniently carried out in conjunction with such general process, from which the mother liquor obtained by evaporation and removal of tachydrite is used as the raw material, and to which the by-product may be returned as stated.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a method of treating a brine of the character described, the steps which consist in evaporating such brine to crystallize out the sodium chloride, evaporating the residual brine containing calcium and magnesium chlorides to crystallize out the latter in the form of tachydrite and leave a mother liquor having a higher proportion of calcium chloride to magnesium chloride than the original brine, and removing the magnesium chloride from such mother liquor as the hydrated double chloride.

$$MgCl_2.2CaCl_2.6H_2O$$

2. In a method of separating calcium chloride from magnesium chloride in solution together, the steps which consist in evaporating such solution to crystallize out the latter in the form of tachydrite and leave a mother liquid having a higher proportion of calcium chloride to magnesium chloride than the original solution, and removing the magnesium chloride from such mother liquor by concentrating such liquor and removing the crystals formed at a temperature between 90° and 175° C.

3. In a method of separating calcium chloride from magnesium chloride in solution together, the steps which consist in evaporating such solution to crystallize out the latter in the form of tachydrite and leave a mother liquor having a higher proportion of calcium chloride to magnesium chloride than the original solution, and removing the magnesium chloride from such mother liquor by concentrating such liquor and removing the crystals formed at a temperature between 90° and 175° C., the water content being reduced until the crystals thus formed consist principally of the hydrated double chloride, $$MgCl_2.2CaCl_2.6H_2O.$$

4. A method of purifying calcium chloride containing magnesium chloride in an amount less than is equivalent to a molecular proportion of two to one, which comprises concentrating a solution of such chlorides and removing the crystals formed at a temperature between 90° and 175° C.

5. A method of purifying calcium chloride containing magnesium chloride in an amount less than is equivalent to a molecular proportion of two to one, which comprises concentrating a solution of such chlorides and removing the crystals formed at a temperature between 90° and 175° C., the water content of the solution being reduced until the crystals thus formed consist principally of the hydrated double chloride, $$MgCl_2.2CaCl_2.6H_2O.$$

6. A method of purifying calcium chloride containing magnesium chloride in an amount less than is equivalent to a molecular proportion of 2 to 1, which consists in concentrating a solution of such chlorides to crystallize the magnesium chloride content thereof as hydrated double chloride, $$MgCl_2.2CaCl_2.6H_2O,$$

and removing the crystals formed thereby.

7. A method of purifying calcium chloride containing magnesium chloride in amount less than is equivalent to a molecular proportion of 2 to 1, which consists in removing magnesium chloride by crystallization as the double chloride, $$MgCl_2.2CaCl_2.6H_2O.$$

8. A method of purifying a solution of calcium chloride containing magnesium chloride in amount less than is equivalent to a molecular proportion of 2 to 1, which consists in concentrating such solution at a temperature and pressure whereat the hydrated double chloride, $$MgCl_2.2CaCl_2.6H_2O,$$

crystallizes out, while avoiding substantial crystallization of calcium chloride dihydrate.

9. A method of purifying calcium chloride containing magnesium chloride in amount less than is equivalent to a molecular proportion of 2 to 1, which comprises concentrating a solution of such chlorides under reduced pressure until calcium chloride dihydrate begins to precipitate, reheating with agitation until such dihydrate crystals are redissolved and separating the remaining crystals of hydrated double salt, $$MgCl_2.2CaCl_2.6H_2O,$$

from the mother liquor.

Signed by me this fifth day of June, 1925.
ALBERT KELVIN SMITH.
Signed by me this tenth day of June, 1925.
CARL F. PRUTTON.